United States Patent

Bonnet

[11] Patent Number: 6,015,039
[45] Date of Patent: Jan. 18, 2000

[54] HIGH SPEED TILTED BELT SORTER

[75] Inventor: Henri Bonnet, Atlanta, Ga.

[73] Assignee: United Parcel Service of America, Inc., Atlanta, Ga.

[21] Appl. No.: 08/795,707

[22] Filed: Feb. 4, 1997

[51] Int. Cl.[7] ............................ B65G 37/00; B65G 47/46
[52] U.S. Cl. ................ 198/368; 198/370.09; 198/463.5; 198/840; 198/360
[58] Field of Search .................................. 198/359, 360, 198/368, 370.01, 370.09, 367.1, 369.6, 369.7, 463.5, 840, 457.02, 457.03

[56] References Cited

U.S. PATENT DOCUMENTS

| | | | |
|---|---|---|---|
| 207,626 | 9/1878 | Sargent | 198/840 |
| 229,275 | 6/1880 | Raymond | 198/840 |
| 1,124,722 | 1/1915 | Gardella | 198/840 |
| 2,410,611 | 11/1946 | Pratt et al. | 198/840 |
| 3,286,811 | 11/1966 | McWilliams . | |
| 3,552,541 | 1/1971 | Riggs . | |
| 3,580,141 | 5/1971 | Richter . | |
| 3,623,592 | 11/1971 | Anderson | 198/463.5 |
| 3,866,740 | 2/1975 | Greathead | 198/463.5 |
| 3,880,751 | 4/1975 | Wirth | 198/359 |
| 3,913,730 | 10/1975 | Gruodis et al. . | |
| 3,918,572 | 11/1975 | Wirth et al. | 198/360 |
| 4,047,712 | 9/1977 | Burkhardt et al. . | |
| 4,598,815 | 7/1986 | Adama . | |
| 4,798,275 | 1/1989 | Leemkuil et al. . | |
| 4,811,830 | 3/1989 | Felder | 198/361 |
| 5,181,597 | 1/1993 | Geerts . | |
| 5,392,927 | 2/1995 | Begemann et al. | 198/370.08 |

FOREIGN PATENT DOCUMENTS

| | | | |
|---|---|---|---|
| 2 256 092 | 7/1975 | France . | |
| 2450127 | 9/1980 | France . | |
| 59-207316 | 11/1984 | Japan | 198/368 |
| 2240530 | 8/1991 | United Kingdom . | |

OTHER PUBLICATIONS

UPS Drawing SML–07, pp. 1–2, "Smalls Gated Conveyor & Slide," Aug. 6, 1993 (rev. Feb. 29, 1996).

*Primary Examiner*—Janice L. Krizek
*Assistant Examiner*—Thuy V. Tran
*Attorney, Agent, or Firm*—Jones & Askew, LLP

[57] ABSTRACT

A sorting apparatus and method operative to selectively discharge articles, such as parcels, from a tilted, gated conveyor to a desired output destination is disclosed. A powered roller is mounted along the top of the gates so that when a gate is lowered to discharge a parcel, the parcel engages the powered roller and is drawn off the conveyor. The gate can be raised before the parcel has completely left the conveyor. The conveyor can be constructed having a width narrower than the parcels.

31 Claims, 3 Drawing Sheets

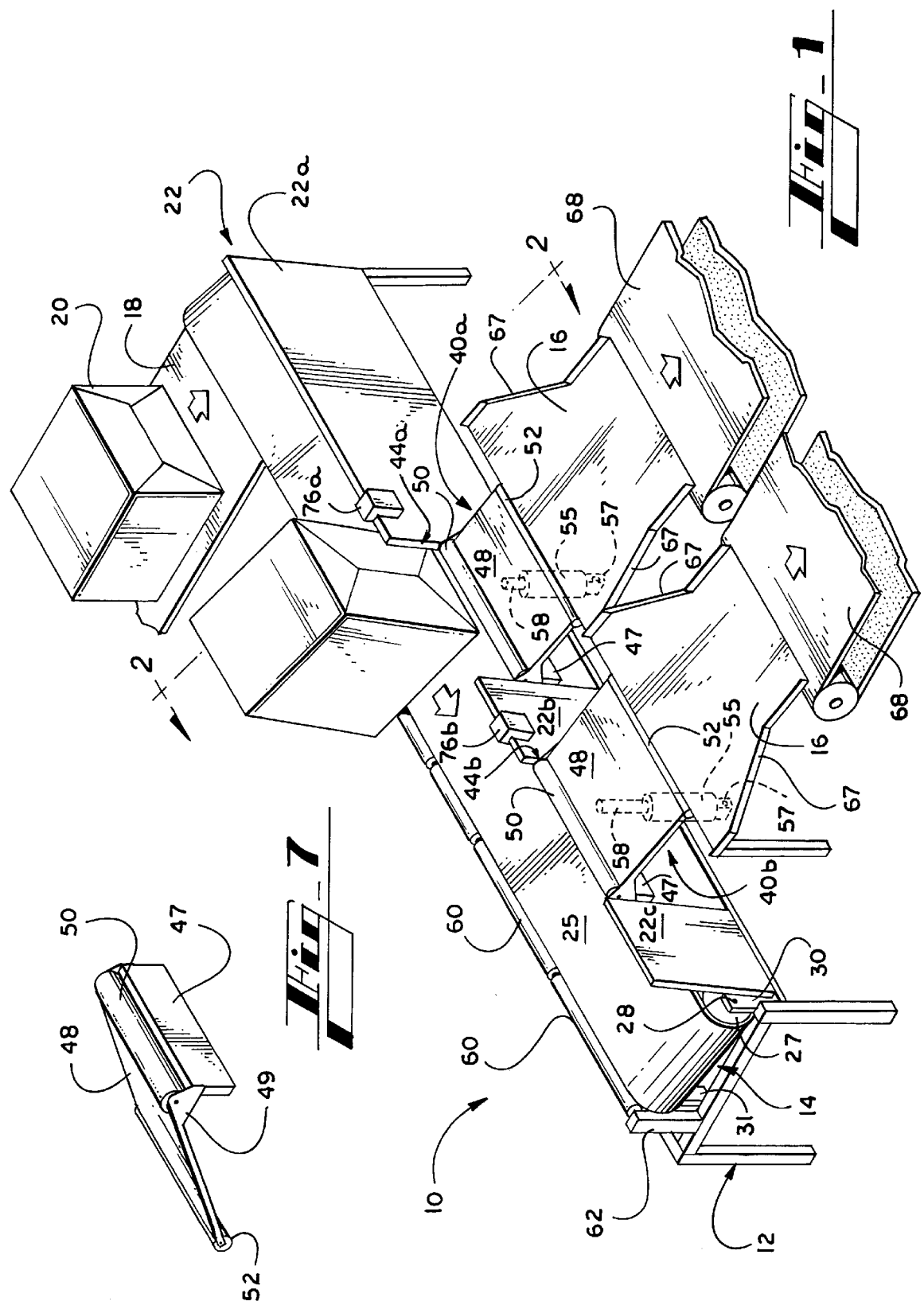

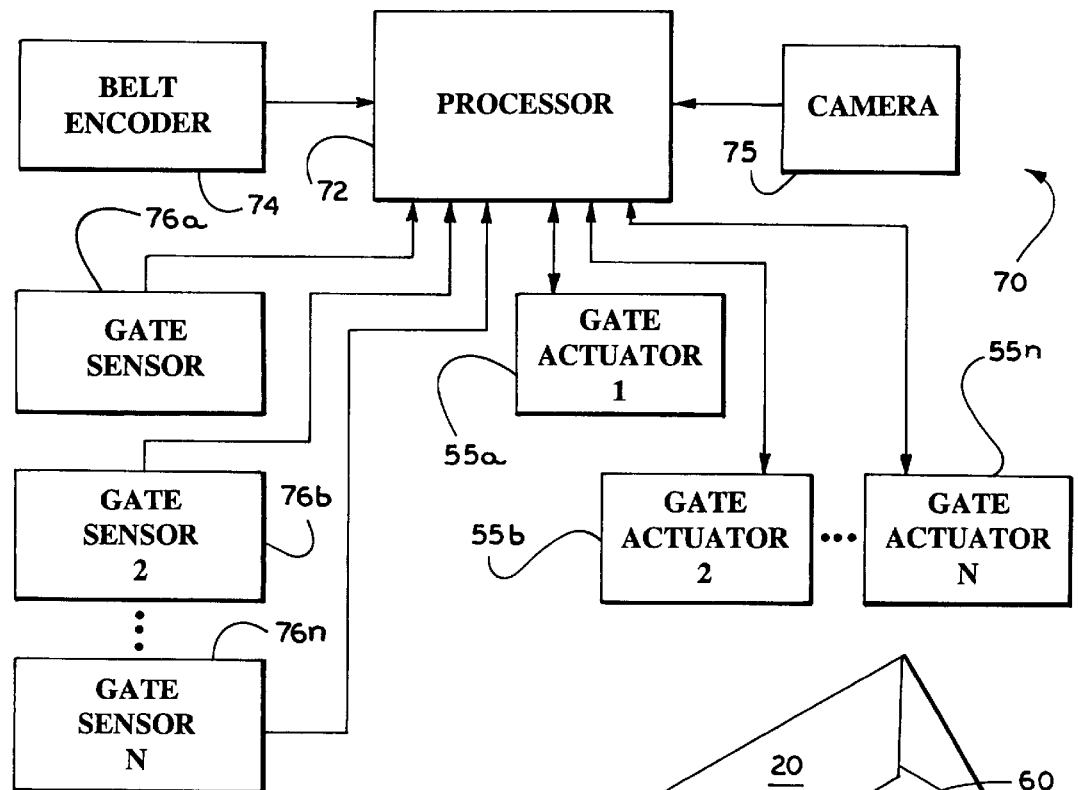
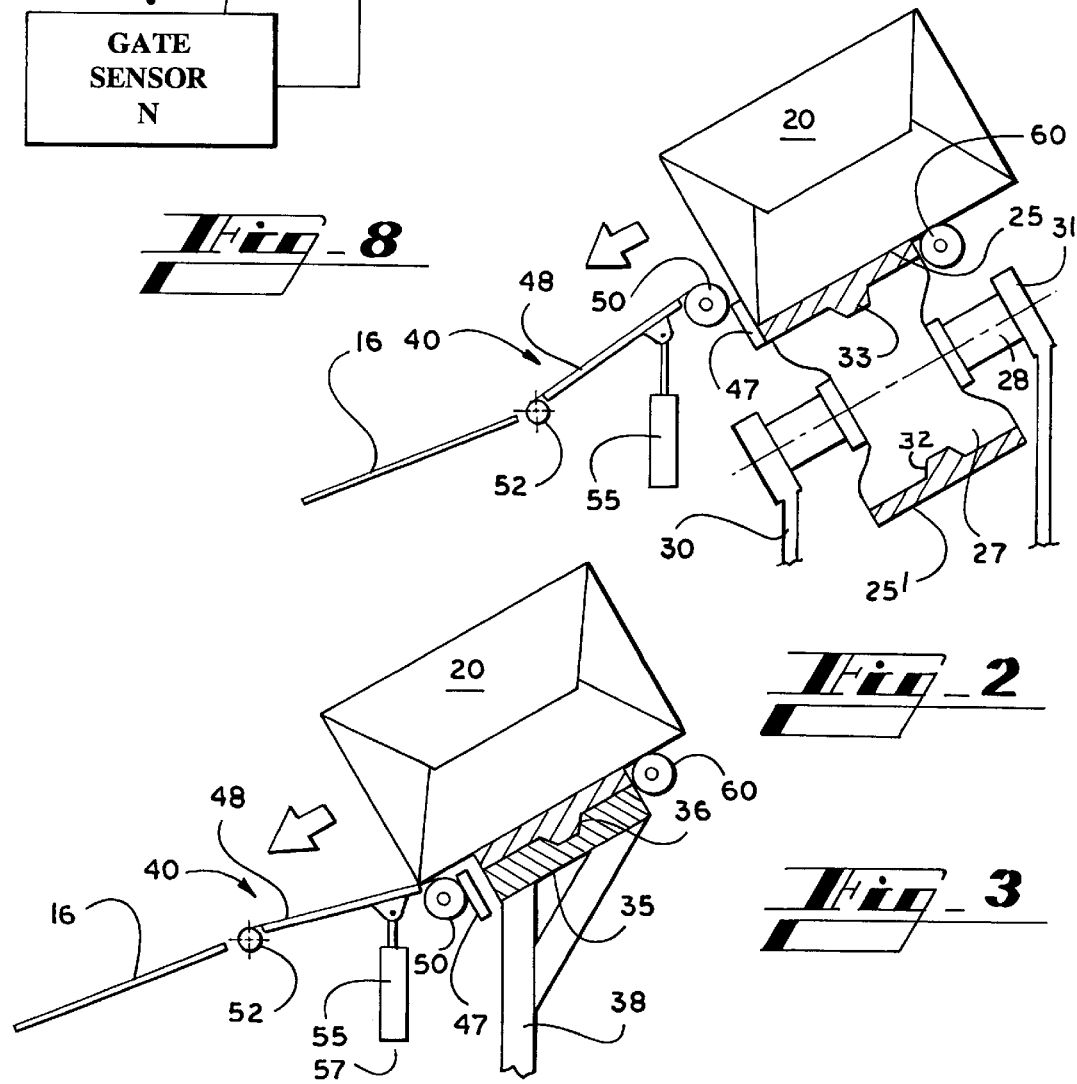

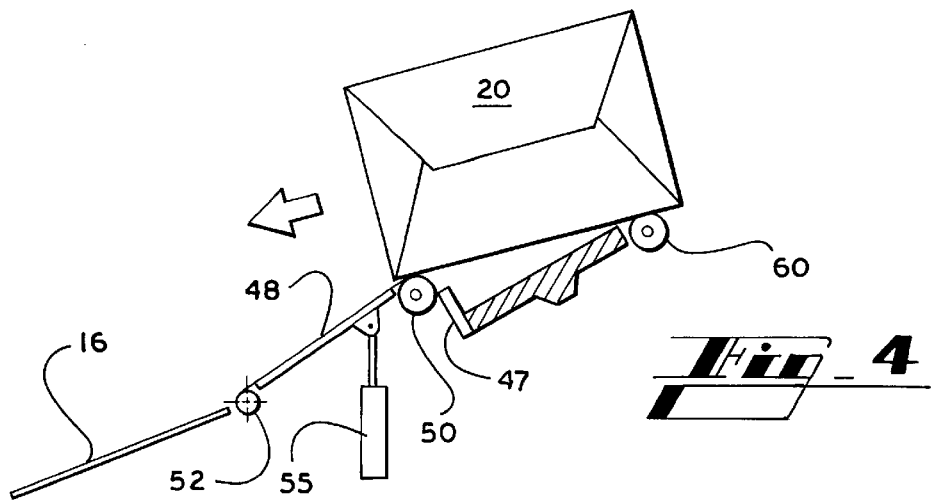
FIG._4
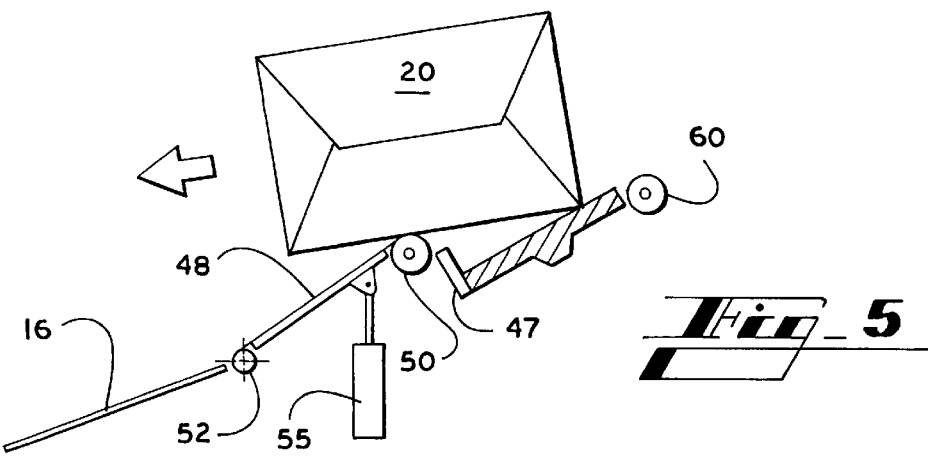
FIG._5
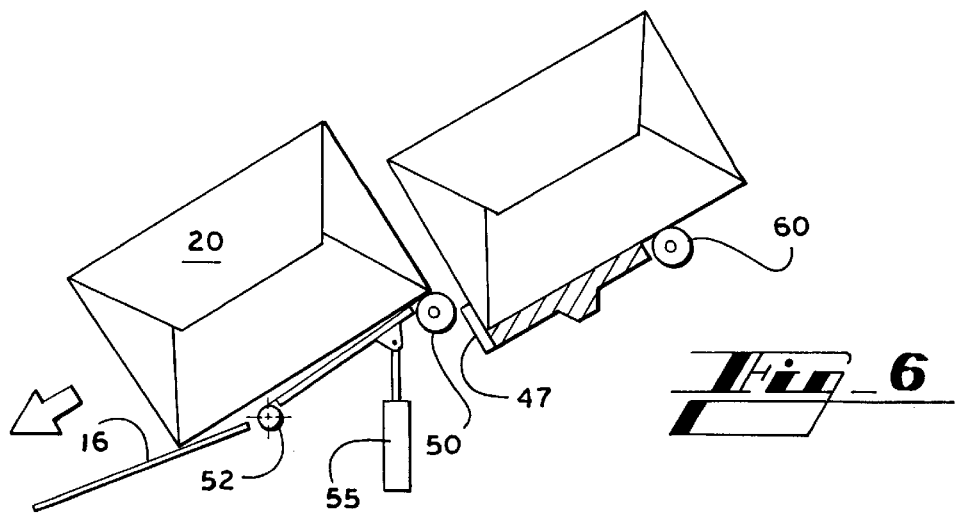
FIG._6

HIGH SPEED TILTED BELT SORTER

TECHNICAL FIELD

The present invention relates to an apparatus for transferring or diverting articles from an initial path of motion, and more particularly relates to a sorting apparatus and method operative to selectively discharge articles, such as parcels, from a tilted conveyor to a desired output destination.

BACKGROUND OF THE INVENTION

Package delivery companies pick up millions of packages daily from thousands of locations over a large geographical area and transport them, primarily by truck and airplane, to a correspondingly large number of scattered destinations. To meet a rigorous schedule and provide accurate deliveries, a package delivery company must use automated transfer systems to match packages arriving at its sorting hubs with proper outgoing transport headed for the packages' destinations. Because deliveries are time sensitive, the sorting equipment must be fast, yet provide accurate and gentle handling of packages.

For these reasons, automatic package sorting systems are rapidly replacing manual sorting stations in package delivery company facilities. Various types of sorting systems have been developed for different needs. To be cost effective, an automatic package sorting system must have a minimum number of moving parts, be easily repairable with minimum downtime, and occupy a minimum amount of space in a sorting "hub" facility.

One type of automatic package sorting system utilizes a tilted conveyor on which parcels are held by a stationary wall in which gates are defined at discharge locations. Systems of this kind are shown in U.S. Pat. Nos. 3,880,751; 3,918,572; and 3,913,730. In such prior systems, a parcel typically slides laterally from the conveyor under the force of gravity, through an opening in the wall formed when a gate is lowered. The conveyor itself is made sufficiently wide to accommodate the full width of the largest expected parcel. Such systems can be operated at high conveyor speeds when used to sort small parcels that pass quickly through the gates. However, larger, heavier parcels slide more slowly from the conveyor, and therefore require slower operation and more spacing between parcels.

U.S. Pat. Nos. 3,880,751 describes a tilted conveyor sorter in which the gates in the guide wall each have a wedge-shaped partial closure wall portion in the trailing portion of the gate. The momentum of the parcels is said to carry them through the opening in the guide wall, and the inclined wedge is intended to accentuate the turning action of the parcels. This action is said to allow closing of the gate to begin before the parcel has cleared the opening, which in turn allows closer spacing of parcels. However, the turning action of the wedge can cause the parcels to tumble, as noted in U.S. Pat. No. 3,918,572.

In the case of larger parcels, the momentum of the parcel at high speed cannot be controlled and directed so easily, and a rapid closing of the gate could result in the parcel not making it through the opening in time. Thus, there is a need for an apparatus capable of isolating large parcels from the driving force of the conveyor, while at the same time discharging the parcel quickly, and closing the gate before the parcel passes completely through the barrier to minimize spacing between parcels.

SUMMARY OF THE INVENTION

The present invention seeks to provide an improved tilted conveyor sorting system capable of operating at high conveyor speed, with quick article discharge and short intervals between articles on the conveyor. The system should occupy a small space and be easy to repair.

In accordance with the invention, this object is accomplished by providing a system and method for transferring articles moving along a tilted conveyor and held on the conveyor by a gated barrier, including a means to enable an article to move through an opening in the barrier easily when a corresponding gate is moved out of the barrier.

Preferably an active means for drawing the article through the opening in the gate, such as a powered roller, is mounted along an upper part of the gate. In an alternative embodiment, an idler roller may be mounted along an upper part of the gate. Also in the preferred embodiment, the gate comprises a blocking member that, when the gate is positioned in the barrier, extends along the lower edge of the conveyor, the roller being mounted longitudinally along an uppermost edge of the blocking member; and a slide plate extending from adjacent to the roller to a longitudinally extending pivot hinge spaced apart from the roller. The roller preferably is positioned outside an inner plane of the barrier when the gate is positioned in the barrier, such that articles moving on the conveyor along the barrier do not contact the roller. An additional longitudinal idler roller preferably is positioned alongside the upper edge of the conveyor at least opposite the gate and below the plane of the conveyor, but sufficiently high to support an article in cooperation with the powered roller above the conveyor.

The conveyor preferably comprises a belt conveyor the plane of which makes an acute angle with the horizontal in a range from about 20° to 30°. The conveyor is capable of transporting articles wider than the transverse width of the conveyor.

In the method of operation of the invention, a control system selectively removes a gate in the barrier to allow the article to move through the opening in the barrier. The active means engages the article and draws the article through the opening in the barrier, and the control system replaces the gate in the barrier when a portion of the article remains positioned over the conveyor.

Other objects, features and advantages of the present invention will become apparent upon reviewing the following detailed description of preferred embodiments of the invention, when taken in conjunction with the drawings and the appended claims.

BRIEF DESCRIPTION OF THE DRAWINGS

FIG. 1 is a pictorial view of a tilted conveyor sorting apparatus embodying the present invention.

FIG. 2 is a diagrammatic cross sectional view of the sorting apparatus taken along line 2—2 of FIG. 1, showing a parcel moving along the conveyor.

FIG. 3 is a diagrammatic cross sectional view of the sorting apparatus of FIG. 1, showing a parcel engaging the powered roller of a lowered gate.

FIG. 4 is a diagrammatic cross sectional view of the sorting apparatus of FIG. 1, showing a parcel suspended above the conveyor on the powered roller and the idler roller.

FIG. 5 is a diagrammatic cross sectional view of the sorting apparatus of FIG. 1, showing a parcel being drawn from the conveyor with the gate partly elevated.

FIG. 6 is a diagrammatic cross sectional view of the sorting apparatus of FIG. 1, showing a parcel sliding down the gate to an output chute, and a following parcel on the conveyor.

FIG. 7 is a pictorial view of a gate assembly used in the sorting apparatus of FIG. 1.

FIG. 8 is a schematic diagram of a control system for operating the sorting apparatus of FIG. 1.

DETAILED DESCRIPTION OF THE PREFERRED EMBODIMENT

Referring now in more detail to the drawings, in which like numerals identify like parts throughout the several views, FIG. 1 shows a tilted conveyor sorting apparatus 10 embodying the present invention. The sorter 10 generally includes an elevated support frame 12 on which a tilted conveyor belt assembly 14 is carried. A plurality of output chutes 16 are positioned to receive parcels 20 that are delivered to the conveyor assembly 14 from an input conveying apparatus 18, carried along a barrier 22, and then selectively discharged from the conveyor belt assembly. The main components of the sorter 10 now will be described in more detail.

The tilted conveyor assembly 14 includes a continuous conveyor belt 25 passing around drive drums 27 (one shown in FIG. 1) at the ends of the frame 12. The direction of movement of the belt 25 is referred to herein as the longitudinal direction. The drive drums are rotatably mounted on drive shafts 28 that are journaled in bearings (not shown) in a pair of mounting plates 30 and 31 extending up from the frame 12 on opposite sides of the drive drum 27. The mounting plate 31 is taller than the plate 30 so as to support the belt 25 at an angle sloping down toward the output chutes 16. The belt should form an acute angle in a range from about 20° to 40° above the horizontal. The preferred angle is about 30°.

One or both of the drive drums are rotated by motors (not shown) connected in a well known manner to the shafts 28. Each drum 27 has a trapezoidal groove 32 formed in the circumferential surface of the drum. A mating guide strip 33 is attached to the inner surface of the belt 25 (or formed integrally with the belt). As best shown in FIG. 2, the groove 32 retains the strip 33 and prevents the belt 25 from sliding off the drums 27 under the force of gravity. As shown in FIG. 3, a belt bed 35 preferably is provided under the carrying run of the belt 25. A plurality of braces 38 attached to the frame 12 or a support surface support the bed 35. The bed 35 defines a groove 36 for receiving the guide strip 33 to retain the belt 25 in alignment between the drums 27. Other means for retaining the belt 25 on the drums 27 are known in the art, such as holding the belt from above by retaining a bead formed along the edge of the belt, or by allowing the belt to ride against stationary parts of the barrier 22. When the grooved bed is part of the belt retaining apparatus, the bed may be provided by a continuous low-friction plate, by a series of transverse, spaced apart members, or by support rollers. The conveyor belt 25 preferably moves at a linear speed of at least about 120–150 meters per minute (400–500 feet per minute).

Those skilled in the art will understand that the present invention can be carried out using other types of conveyors, such as slat conveyors or roller conveyors in which the rollers are driven or longitudinally sloping. Also the longitudinal conveying apparatus could be a chute that slopes longitudinally as well as transversely. Likewise, the input conveying apparatus 18 can be a chute or a powered belt, slat, or roller conveyor, or the parcels can be placed manually on the main conveyor 25.

The barrier 22 prevents parcels from sliding off the belt 25 until they are discharged. A plurality of gate assemblies 40 form part of the barrier 22 at spaced intervals, filling openings 44 between stationary barrier sections 22a, 22b, and 22c. A gate assembly 40a is positioned in opening 44a and a gate assembly 40b is positioned in the opening 44b. Although only two gates are shown in FIG. 1, the sorter 10 can be extended in length to provide as many gates as desired. The barrier section 22a is positioned opposite from the input conveying apparatus 18 to retain parcels sliding onto the belt 25.

It will be seen that the center of gravity of a parcel 20 on the tilted belt 25 is directed down toward a point not far from the barrier 22. Therefore, a conveyor sorter 10 embodying the invention preferably utilizes a belt 25 that is considerably narrower than the largest parcels expected to be handled on the sorter 10. Preferably the width of the belt 25 is no more than about one third to one half of the width of the larger parcels to be sorted. Generally, the belt need only extend under the center of gravity of the packages on the tilted belt 25. The best width for a particular group of parcels can be empirically determined, but a width of 15–30 cm (6–12 inches) will be sufficient for most parcel sorting operations.

Each gate assembly 40 includes a blocking plate 47 that is aligned with the sections of the barrier 22 when the gate is in an upper position, as is gate 40b in FIG. 1. The blocking plate 47 is connected to a sloping slide plate 48 by a pair of connecting plates 49, forming an acute angle between the blocking and slide plates, as best shown in FIGS. 1 and 7. Thus, when the blocking plate is aligned with the sections of the barrier 22, the slide plate slopes down to the output chute 16. A gap is left between the blocking plate and the slide plate, in which is mounted a lagged powered roller 50. The roller 50 is inset slightly from the plane of the barrier 22 so that, when the blocking plate is aligned with the barrier, parcels passing by the gate without being discharged will not strike or drag on the roller. The conventional powered roller 50 has an internal electric motor capable of driving the roller to pull a large parcel from the conveyor belt 25 over the blocking wall 47.

In an alternate embodiment, the roller 50 may be an idler roller, and the parcels are allowed to roll over the gate under the force of gravity as a result of the decreased friction created by the roller.

Where the slide plate 48 meets the output chute 16 the gate 40 is pivoted about a longitudinal hinge 52. An actuator 55, such as a hydraulic, electric, or pneumatic cylinder, is mounted at a pivot 57 to frame members (not shown) beneath the slide plate 48 of the gate 40. A rod 58 extendible from the cylinder 55 is pivotally attached to the underside of the slide plate 48 for the purpose of raising and lowering the gate 40 about the hinge 52. The upper position of the gate is as described above for the gate 40b. The gate 40a in FIG. 1 is in the lower position, in which the top of the roller 50 is approximately even with the lower edge of the belt 25. When the roller 50 is in the lowered position, parcels on the belt 25 are able to slide into engagement with the roller, which then can propel the parcel from the belt.

Along the upper edge of the conveyor belt 25, a line of idler rollers 60 is mounted on mounting plates 62. The idler rollers 60 are mounted at a level just below the upper edge of the belt 25 so that parcels moving longitudinally on the belt do not strike or drag on the rollers. However, the rollers 60 are positioned so that when a powered roller 50 begins to rise with a parcel thereon, the parcel can rest on the rollers 50 and 60 spaced above the belt 25 until the trailing end of the parcel clears the rollers 60. This reduces friction as the powered roller pulls the parcel.

The output chutes 16 direct parcels from the slide plates 48 of the gates to output conveyors 68 that carry the parcels to a destination, such as a truck loading dock. Ridges 67 along the sides of the chutes 16 prevent the parcels from falling off the chutes.

FIG. 8 shows a control system 70 suitable for automatically operating the sorter 10. The sorting process is controlled by a digital controller 72. The controller may be a programmed general purpose personal computer or a programmable logic controller (PLC). The controller receives input from a rotary belt encoder 74 of a type well known in the art associated with the belt 25, and from a camera 75 or an alternative label reader or manual input device. The camera 75 or other input device is used to acquire destination data about each package as the package is placed onto the sorting system. Any bar codes or other symbols on a label on the package are detected and decoded. Destination information may be embedded in a dense code, or may be stored in a database location the address of which is contained in a bar code. Furthermore, textual address information on the label can be analyzed using OCR techniques. When a package is imaged at the reader 75, the current count of the encoder 74 is obtained. The rotary encoder device 74 allows the controller to track how far the belt 25 has traveled since any particular package was input onto the system from the input conveyor 18.

A suitable system for imaging labels is shown in U.S. Pat. Nos. 5,291,564; 5,308,960; 5,327,171; and 5,430,282 which are incorporated herein by reference. Systems for locating and decoding bar codes and the MaxiCode dense code symbology are described in U.S. Pat. Nos. 4,874,936; 4,896,029; 5,438,188; 5,412,196; 5,412,197; 5,343,028; 5,352,878; 5,404,003; 5,384,451 and PCT Publication No. WO 95/34043, respectively, all of which are incorporated herein by reference.

A record for each package stored in the controller memory may contain the package identification, destination address, and package characteristics. A description of the contents of the package, its dimensions and weight, or a code indicating the contents are fragile or hazardous or have some other special status, may be stored.

In a known manner, the controller 72 determines when a package should be discharged. At such times, the controller provides control signals instructing the appropriate actuator 55 when to operate to drop a gate 40 to transfer parcels off the conveyor belt 25. A system for timing the discharge of packages from a sorter is described in U.S. Pat. No. 5,433,311 to Bonnet, which is incorporated herein by reference.

Once the destination information for the package is known, the controller 72 looks up in an appropriate part of its memory the proper output chute corresponding to the package's destination, and the number of encoder counts between the reader 75 location and a gate sensor 76 near the destination output gate 40. The count that the encoder will send to the controller when this location is reached, referred to as a discharge count, is calculated by the controller. Preferably, this information is stored in fields of the record already created for the package.

The controller reads the encoder count as the conveyor 25 travels, and compares the encoder count to the list of discharge counts stored in memory. When the controller receives a discharge count, it reads the associated destination chute identification, and upon receiving a signal from that chute's gate sensor 76, sends a signal to the corresponding actuator 55. This signal also starts the rotation of the powered roller 50 of that gate. The actuator drops the gate to its lowered position as the parcel clears the barrier and arrives adjacent to the opening 44. The parcel then slides down the slope of the belt 25 until the parcel engages the lagged powered roller 50, which immediately begins to draw the parcel off the belt 25, as shown in FIG. 3.

At a predetermined time delay after the trailing end of the parcel clears the gate sensor 76, the actuator 55 begins to raise the gate 40, unless the next parcel is also to be discharged at the same gate. This time delay is set to expire as soon as the parcel is securely engaged with the roller 50, as shown in FIG. 3. The lifting of the roller 50 soon causes the parcel to engage the idler roller 60, so that parcel is supported above the moving belt 25 on the powered roller 50 and the idler roller 60, as shown in FIG. 4. This provides for low friction transverse movement of the parcel. Thereafter, the parcel is pulled off the idler roller 60, as shown in FIG. 5, but its center of gravity now is near the powered roller 50, and only a corner edge of the parcel is on the belt 25. The powered roller 50 quickly draws the parcel over the raised blocking plate 47 and onto the slide plate 48, from which it slides into the output chute 16.

As shown in FIG. 6, the early raising of the gate allows the next parcel to be closely spaced to the parcel being discharged. Preferably, the parcels are spaced no farther from one another than about 60 centimeters (2 feet). Even in the case of large parcels, the next parcel can begin to traverse the opening 44 without sliding into the opening 44, now blocked by the blocking plate 47 of the gate 40. The plate 47 need be raised only a short part of its full height to prevent a parcel from sliding into the opening 44. The powered roller provides an active device for drawing the parcel off the belt 25 even after the gate 40 is raised to its upper position.

Those skilled in the art will understand that the programs, processes, methods, etc. described herein are not related or limited to any particular computer or apparatus. Rather, various types of general purpose machines may be used with programs constructed in accordance with the teachings described herein. Similarly, it may prove advantageous to construct specialized apparatus to perform the method steps described herein by way of dedicated computer systems with hard-wired logic or programs stored in nonvolatile memory, such as read only memory. A programmable logic controller (PLC) may be appropriate.

From the foregoing it will be understood that the present invention provides an efficient, high speed sorting system suitable for large parcels. The tilted belt sorter described herein is capable of isolating large parcels from the driving force of the conveyor, while at the same time discharging the parcel quickly, and closing the gate before the parcel passes completely through the barrier to minimize spacing between parcels. The system minimizes the space required by reducing the size of the tilted conveyor.

While this invention has been described in detail with particular reference to a preferred embodiment thereof, it will be understood that modifications and variations may be made without departing from the scope of the invention as defined in the appended claims.

What is claimed is:

1. An article transferring apparatus, comprising:
    a longitudinally extending conveyor disposed with its transverse dimension angled from an upper edge to a lower edge;
    a barrier extending along said lower edge, whereby articles on said conveyor are prevented from sliding off said angled conveyor;
    at least one gate positioned in said barrier;

active means for drawing an article engaging said means away from said conveyor;

an actuator operatively connected to said gate for selectively removing said gate from said barrier to a position which allows an article on said conveyor to slide into engagement with said active means.

2. The apparatus of claim 1, wherein said active means comprises a powered roller positioned along an upper part of said gate.

3. The apparatus of claim 2, wherein said barrier is stationary relative to movement of said conveyor.

4. The apparatus of claim 3, wherein said gate comprises:

a blocking member that, when said gate is positioned in said barrier, extends along said lower edge of said conveyor, said powered roller being mounted longitudinally along an uppermost edge of said blocking member; and a slide plate extending from adjacent to said powered roller to a longitudinally extending pivot hinge spaced apart from said powered roller.

5. The apparatus of claim 4, wherein said powered roller is positioned outside an inner plane of said barrier when said gate is positioned in said barrier, such that articles moving on said conveyor along said barrier do not contact said powered roller.

6. The apparatus of claim 4, further comprising a longitudinal idler roller positioned alongside the upper edge of said conveyor at least opposite said gate.

7. The apparatus of claim 6, wherein said idler roller is positioned below the plane of said conveyor, but sufficiently high to support an article in cooperation with said powered roller above said conveyor.

8. The apparatus of claim 4, further comprising a stationary slide positioned to receive an article from said slide member of said gate.

9. The apparatus of claim 4, wherein said gate comprises a plate mounted for movement perpendicular to said conveyor, said powered roller being mounted along a top edge of said plate.

10. The apparatus of claim 1, wherein said conveyor comprises a belt conveyor.

11. The apparatus of claim 1, where the plane of said conveyor makes an acute angle with the horizontal in a range from about 20° to 40°.

12. The apparatus of claim 11, wherein said conveyor is capable of transporting articles wider than the transverse width of said conveyor.

13. A sorting apparatus, comprising:

a longitudinally extending conveyor disposed with its transverse dimension angled from an upper edge to a lower edge;

a barrier extending along said lower edge, whereby articles on said conveyor are prevented from sliding off said angled conveyor;

a plurality of gates positioned in said barrier;

a plurality of rollers each positioned along an upper part of one of said gates; and a plurality of actuators each operatively connected to one of said gates for selectively removing said gate from said barrier to a position in which an article on said conveyor can slide into engagement with said roller.

14. The apparatus of claim 13, wherein each said rollers comprises a powered roller.

15. The apparatus of claim 14, wherein each of said gates comprises:

a blocking member that, when said gate is positioned in said barrier, extends along said lower edge of said conveyor, said powered roller being mounted longitudinally along an uppermost ridge of said blocking member; and a slide plate extending from adjacent to said powered roller to a longitudinally extending pivot hinge spaced downwardly from said powered roller.

16. The apparatus of claim 15, wherein each of said powered rollers is positioned outside an inner plane of said barrier when said gate is positioned in said barrier, such that articles moving on said conveyor along said barrier do not contact said powered roller.

17. The apparatus of claim 15, further comprising at least one longitudinal idler roller positioned alongside the upper edge of said conveyor at least opposite said gates.

18. The apparatus of claim 17, wherein said idler rollers are positioned below the plane of said conveyor, but sufficiently high to support an article in cooperation with one of said powered rollers above said conveyor.

19. The apparatus of claim 15, further comprising a plurality of stationary slides each positioned to receive an article from said slide member of one of said gates.

20. The apparatus of claim 15, wherein each of said gates comprises a plate mounted for movement perpendicular to said conveyor, said powered roller being mounted along a top edge of said plate.

21. The apparatus of claim 15, wherein each of said actuators comprises means for pivoting said gate about said pivot hinge from a raised position in which said blocking member is positioned in said barrier to a lowered position in which said powered roller is approximately even with a carrying surface of said conveyor.

22. The apparatus of claim 14, wherein said conveyor comprises a belt conveyor.

23. The apparatus of claim 14, where the plane of said conveyor makes an acute angle with the horizontal in a range from about 20° to 40°.

24. The apparatus of claim 23, wherein said conveyor, in cooperation with said barrier, is capable of transporting articles wider than the transverse width of said conveyor.

25. The apparatus of claim 14, wherein said longitudinally extending conveyor comprises an endless belt conveyor including a guide strip extending inwardly from an inner surface of said belt, said belt passing around drums defining circumferential grooves for receiving said guide strip.

26. A method of transferring articles, comprising the steps of:

providing a longitudinally extending conveyor disposed with its transverse dimension angled from an upper edge to a lower edge and a barrier extending along said lower edge, whereby articles on said conveyor are prevented from sliding off said angled conveyor;

moving said conveyor longitudinally to transport an article;

selectively removing a gate in said barrier to allow said article to move through an opening in said barrier;

engaging said article with a device capable of moving said article;

drawing said article through said opening in said barrier with said device; and replacing said gate in said barrier when a portion of said article remains positioned over said conveyor.

27. The method of claim 26, wherein said step of engaging said article with said device comprises engaging a lower surface of said article with a powered roller operatively connected to said gate.

28. The method of claim 27, wherein said powered roller is positioned on an upper part of said gate, and wherein said of removing said gate comprises lowering said gate until said article can slide from said conveyor into engagement with said powered roller.

29. The method of claim 28, wherein said step of moving said conveyor longitudinally to transport an article comprises moving said conveyor at a linear speed of at least about 120 meters per minute (400 feet per minute).

30. The method of claim 29, wherein said step of moving said conveyor longitudinally to transport an article comprises transporting a plurality of articles spaced no farther from one another than about 60 centimeters (2 feet).

31. A method of transferring articles, comprising the steps of:

provyiding a longitudinally extending conveyor disposed with its transverse dimension angled from an upper edge to a lower edge and a barrier extending along said lower edge, whereby articles on said conveyor are prevented from sliding off said angled conveyor;

moving said conveyor longitudinally to transport an article;

selectively removing a gate in said barrier to allow said article to move through an opening in said barrier;

engaging a lower surface of said article with a roller positioned along an upper portion of said gate;

replacing said gate in said barrier when a portion of said article remains positioned over said conveyor.

* * * * *